United States Patent
Shustorovich et al.

(10) Patent No.: US 9,940,511 B2
(45) Date of Patent: Apr. 10, 2018

(54) MACHINE PRINT, HAND PRINT, AND SIGNATURE DISCRIMINATION

(71) Applicant: Kofax, Inc., Irvine, CA (US)

(72) Inventors: Alexander Shustorovich, Pittsford, NY (US); Christopher W. Thrasher, Rochester, NY (US); Anthony Macciola, Irvine, CA (US); Jan W. Amtrup, Silver Spring, MD (US)

(73) Assignee: KOFAX, INC., Irvine, CA (US)

( * ) Notice: Subject to any disclaimer, the term of this patent is extended or adjusted under 35 U.S.C. 154(b) by 194 days.

(21) Appl. No.: 14/726,335

(22) Filed: May 29, 2015

(65) Prior Publication Data

US 2015/0347836 A1 Dec. 3, 2015

Related U.S. Application Data

(60) Provisional application No. 62/005,950, filed on May 30, 2014.

(51) Int. Cl.
G06K 9/34 (2006.01)
G06K 9/00 (2006.01)

(52) U.S. Cl.
CPC ..... *G06K 9/00422* (2013.01); *G06K 9/00187* (2013.01); *G06K 9/346* (2013.01)

(58) Field of Classification Search
CPC . G06F 3/04883; G06F 19/24; G06K 9/00617; G06K 9/18; G06K 7/1417; G06T 11/60; G06T 7/246

See application file for complete search history.

(56) References Cited

U.S. PATENT DOCUMENTS 3,873,972 A * 3/1975 Levine ............... G06K 9/80
382/161
4,501,016 A * 2/1985 Persoon ............. G06K 9/56
382/272

(Continued)

OTHER PUBLICATIONS

Shetty, S., Srinivasan, H., Beal, M., & Srihari, S. (2007). Segmentation and labeling of documents using conditional random fields. Document Recognition and Retrieval XIV. doi:10.1117/12.704410.*

(Continued)

*Primary Examiner* — Iman K Kholdebarin
*Assistant Examiner* — Mai Tran
(74) *Attorney, Agent, or Firm* — Zilka-Kotab, P.C.

(57) ABSTRACT

Systems, computer program products, and techniques for discriminating hand and machine print from each other, and from signatures, are disclosed and include determining a color depth of an image, the color depth corresponding to at least one of grayscale, bi-tonal and color; reducing color depth of non-bi-tonal images to generate a bi-tonal representation of the image; identifying a set of one or more graphical line candidates in either the bi-tonal image or the bi-tonal representation, the graphical line candidates including one or more of true graphical lines and false positives; discriminating any of the true graphical lines from any of the false positives; removing the true graphical lines from the bi-tonal image or the bi-tonal representation without removing the false positives to generate a component map comprising connected components and excluding graphical lines; and identifying one or more of the connected components in the component map.

19 Claims, 4 Drawing Sheets

(56) References Cited

U.S. PATENT DOCUMENTS

| | | | | |
|---|---|---|---|---|
| 5,321,770 A * | 6/1994 | Huttenlocher | G06K 9/00463 | 382/174 |
| 5,402,504 A * | 3/1995 | Bloomberg | G06K 9/00456 | 382/175 |
| 5,721,790 A * | 2/1998 | Klenner | G06K 9/2054 | 382/138 |
| 5,841,902 A * | 11/1998 | Tu | G06K 9/222 | 382/187 |
| 5,898,157 A * | 4/1999 | Mangili | G06K 17/00 | 235/380 |
| 5,933,531 A * | 8/1999 | Lorie | G06K 9/033 | 345/108 |
| 5,953,451 A * | 9/1999 | Syeda-Mahmood | G06K 9/00859 | 382/187 |
| 6,154,565 A * | 11/2000 | Johnson | G06K 9/38 | 382/187 |
| 6,249,605 B1 * | 6/2001 | Mao | G06K 9/00872 | 382/178 |
| 6,259,812 B1 * | 7/2001 | Mao | G06K 9/00872 | 382/186 |
| 6,266,445 B1 * | 7/2001 | Krtolica | G06K 9/38 | 382/209 |
| 6,363,162 B1 * | 3/2002 | Moed | G06K 9/00154 | 382/100 |
| 6,681,044 B1 * | 1/2004 | Ma | G06K 9/222 | 382/185 |
| 6,798,895 B1 * | 9/2004 | Takahashi | G06K 9/2054 | 382/101 |
| 6,940,617 B2 * | 9/2005 | Ma | G06K 9/6835 | 358/1.15 |
| 7,168,614 B2 * | 1/2007 | Kotovich | G06Q 20/04 | 235/379 |
| 7,201,323 B2 | 4/2007 | Kotovich et al. | | |
| 7,249,717 B2 | 7/2007 | Kotovich et al. | | |
| 7,266,218 B2 * | 9/2007 | Call | B07C 3/14 | 382/101 |
| 7,415,130 B1 * | 8/2008 | Rundle | B07C 1/00 | 209/584 |
| 7,430,310 B2 | 9/2008 | Kotovich et al. | | |
| 7,657,091 B2 | 2/2010 | Postnikov et al. | | |
| 7,778,457 B2 | 8/2010 | Nepomniachtchi et al. | | |
| 7,787,695 B2 * | 8/2010 | Nepomniachtchi | G06K 9/222 | 382/186 |
| 7,949,176 B2 | 5/2011 | Nepomniachtchi | | |
| 7,953,268 B2 | 5/2011 | Nepomniachtchi | | |
| 7,978,900 B2 | 7/2011 | Nepomniachtchi et al. | | |
| 8,000,514 B2 | 8/2011 | Nepomniachtchi et al. | | |
| 8,326,015 B2 | 12/2012 | Nepomniachtchi | | |
| 8,379,914 B2 * | 2/2013 | Nepomniachtchi | G06Q 20/042 | 235/379 |
| 8,483,473 B2 * | 7/2013 | Roach | G06Q 20/042 | 235/379 |
| 8,509,534 B2 * | 8/2013 | Galic | G06K 9/00456 | 382/176 |
| 8,532,419 B2 | 9/2013 | Coleman | | |
| 8,559,766 B2 * | 10/2013 | Tilt | G06T 1/0007 | 348/211.2 |
| 8,577,118 B2 * | 11/2013 | Nepomniachtchi | G06K 9/3275 | 382/137 |
| 8,582,862 B2 * | 11/2013 | Nepomniachtchi | G06K 9/32 | 138/140 |
| 8,620,058 B2 | 12/2013 | Nepomniachtchi et al. | | |
| 8,724,924 B2 * | 5/2014 | Nepomniachtchi | G06K 9/6211 | 382/276 |
| 8,855,375 B2 | 10/2014 | Macciola et al. | | |
| 8,855,425 B2 | 10/2014 | Schmidtler et al. | | |
| 8,885,229 B1 | 11/2014 | Amtrup et al. | | |
| 2002/0051575 A1 * | 5/2002 | Myers | G06K 9/3258 | 382/202 |
| 2003/0007683 A1 * | 1/2003 | Wang | G06K 9/00456 | 382/159 |
| 2003/0215136 A1 * | 11/2003 | Chao | G06K 9/3283 | 382/176 |
| 2004/0037470 A1 * | 2/2004 | Simske | G06F 17/273 | 382/229 |
| 2006/0124724 A1 * | 6/2006 | Kotovich | G06Q 20/042 | 235/379 |
| 2006/0124725 A1 * | 6/2006 | Kotovich | G06Q 20/04 | 235/379 |
| 2006/0177118 A1 * | 8/2006 | Ibikunle | G06K 9/72 | 382/137 |
| 2006/0193518 A1 * | 8/2006 | Dong | G06K 9/00859 | 382/186 |
| 2007/0205261 A1 * | 9/2007 | Postnikov | G06K 9/00154 | 235/379 |
| 2008/0159589 A1 * | 7/2008 | Benyoub | G06K 9/38 | 382/101 |
| 2009/0003700 A1 * | 1/2009 | Xiao | G06K 9/4638 | 382/176 |
| 2010/0008581 A1 * | 1/2010 | Bressan | G06K 9/00859 | 382/177 |
| 2010/0150424 A1 * | 6/2010 | Nepomniachtchi | G06K 9/36 | 382/140 |
| 2010/0310132 A1 * | 12/2010 | Perez Gonzalez | G06K 9/4642 | 382/112 |
| 2011/0007366 A1 * | 1/2011 | Sarkar | G06K 9/00456 | 358/462 |
| 2011/0007964 A1 * | 1/2011 | Saund | G06K 9/00456 | 382/162 |
| 2011/0007970 A1 * | 1/2011 | Saund | G06K 9/00449 | 382/176 |
| 2011/0013847 A1 * | 1/2011 | Statsenko | G06K 9/00456 | 382/224 |
| 2012/0269398 A1 * | 10/2012 | Fan | G06K 9/3258 | 382/105 |
| 2013/0051607 A1 * | 2/2013 | Highley | G06K 9/00449 | 382/100 |
| 2013/0182002 A1 * | 7/2013 | Macciola | H04N 1/387 | 345/589 |
| 2013/0308832 A1 * | 11/2013 | Schmidtler | G06K 9/00469 | 382/112 |
| 2014/0010430 A1 * | 1/2014 | Chandelier | A61B 6/5217 | 382/131 |
| 2014/0270349 A1 * | 9/2014 | Amtrup | G06K 9/00469 | 382/103 |
| 2014/0270536 A1 * | 9/2014 | Amtrup | G06K 9/00442 | 382/195 |
| 2014/0327940 A1 * | 11/2014 | Amtrup | H04N 1/00251 | 358/473 |
| 2015/0269431 A1 * | 9/2015 | Haji | G06K 9/00879 | 382/186 |

OTHER PUBLICATIONS

Gunter, S. (2004). Multiple Classifier Systems in Offline Cursive Handwriting Recognition [Ph.D Dissertation], Univeristy of Bern, Switzerland.*

Guillevic, D., & Suen, C.Y. (1994). Cursive Script Recognition: a Sentence Level Recognition Scheme.*

CamScanner, "How to use CamScanner," Tutorial, Sep. 7, 2012, pp. 1-12, retrieved from http://resource.intsig.net/manual/Android_CamScanner_UG_1.2.1_en.pdf.

"Eight-point algorithm," Wikipedia, page last modified Apr. 18, 2014, pp. 1-7, retrieved from http://en.wikipedia.org/wiki/Eight-point_algorithm.

Shirdhonkar, M. S. et al., "Discrimination Between Printed and Handwritten Text in Documents," IJCA Special Issue on Recent Trends in Image Processing and Pattern Recognition, 2010, pp. 131-134.

U.S. Appl. No. 61/819,463, filed May 3, 2013.

* cited by examiner

MACHINE PRINT, HAND PRINT, AND SIGNATURE DISCRIMINATION

RELATED APPLICATIONS

The present application claims the benefit of priority from U.S. Provisional Patent Application No. 62/005,950, filed May 30, 2014 and entitled "Machine Print, Hand Print, and Signature Discrimination", the subject matter of which is herein incorporated by reference.

FIELD OF INVENTION

The present inventive disclosures relate to image processing, and more particularly to processing digital image data to identify the presence of and/or distinguish among present (1) machine-printed, (2) hand-printed, and (3) signature markings, symbols, characters, etc. as represented on a document.

BACKGROUND

Existing approaches permit the identification of characters depicted in documents using optical techniques such as optical character recognition.

Therefore, it would be highly beneficial to provide new methods, systems and/or computer program product technologies configured to supplement and/or replace tactile input as a mechanism for receiving user input and generating output, especially output that is determined in whole or in part based upon the received input and context of the situation in which input was received or the purpose for which the input is provided.

BRIEF SUMMARY OF THE INVENTIVE EMBODIMENTS

In one embodiment, a method includes receiving an image; determining a color depth of the received image, the color depth corresponding to at least one of grayscale, bi-tonal and color; reducing color depth of the received image to generate a bi-tonal representation of the image in response to determining the color depth of the received image is not bi-tonal; identifying a set of one or more graphical line candidates in either the bi-tonal image or the bi-tonal representation, the graphical line candidates including one or more of true graphical lines and false positives; discriminating any of the true graphical lines from any of the false positives; removing the true graphical lines from the bi-tonal image or the bi-tonal representation without removing the false positives to generate a component map comprising connected components and excluding graphical lines; and identifying one or more of the connected components in the component map.

In another embodiment, a system includes a processor and logic in and/or executable by the processor to: receive an image; determine a color depth of the received image, the color depth corresponding to at least one of grayscale, bi-tonal and color; reduce color depth of the received image to generate a bi-tonal representation of the image in response to determining the color depth of the received image is not bi-tonal; identify a set of one or more graphical line candidates in the bi-tonal representation, the graphical line candidates including one or more of true graphical lines and false positives; discriminate any of the true graphical lines from any of the false positives; remove the true graphical lines from the bi-tonal representation without removing the false positives to generate a component map comprising connected components and excluding graphical lines; and identify one or more of the connected components in the component map.

In yet another embodiment, a computer program product includes: a computer readable storage medium having program code embodied therewith, the program code readable/executable by a processor to: receive an image; determine a color depth of the received image, the color depth corresponding to at least one of grayscale, bi-tonal and color; reduce color depth of the received image to generate a bi-tonal representation of the image in response to determining the color depth of the received image is not bi-tonal; identify a set of one or more graphical line candidates in the bi-tonal representation, the graphical line candidates including one or more of true graphical lines and false positives; discriminate any of the true graphical lines from any of the false positives; remove the true graphical lines from the bi-tonal representation without removing the false positives to generate a component map comprising connected components and excluding graphical lines; and identify one or more of the connected components in the component map.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The present application refers to image processing of images (e.g. pictures, figures, graphical schematics, single frames of movies, videos, films, clips, etc.) captured by cameras, especially cameras of mobile devices. As understood herein, a mobile device is any device capable of receiving data without having power supplied via a physical connection (e.g. wire, cord, cable, etc.) and capable of receiving data without a physical data connection (e.g. wire, cord, cable, etc.). Mobile devices within the scope of the present disclosures include exemplary devices such as a mobile telephone, smartphone, tablet, personal digital assistant, iPod®, iPad®, BLACKBERRY® device, etc.

However, as it will become apparent from the descriptions of various functionalities, the presently disclosed mobile image processing algorithms can be applied, sometimes with certain modifications, to images coming from scanners and multifunction peripherals (MFPs). Similarly, images processed using the presently disclosed processing algorithms may be further processed using conventional scanner processing algorithms, in some approaches.

Of course, the various embodiments set forth herein may be implemented utilizing hardware, software, or any desired combination thereof. For that matter, any type of logic may be utilized which is capable of implementing the various functionality set forth herein.

One benefit of using a mobile device is that with a data plan, image processing and information processing based on captured images can be done in a much more convenient, streamlined and integrated way than previous methods that relied on presence of a scanner. However, the use of mobile devices as document(s) capture and/or processing devices has heretofore been considered unfeasible for a variety of reasons.

In one approach, an image may be captured by a camera of a mobile device. The term "camera" should be broadly interpreted to include any type of device capable of capturing an image of a physical object external to the device, such as a piece of paper. The term "camera" does not encompass a peripheral scanner or multifunction device. Any type of camera may be used. Preferred embodiments may use cameras having a higher resolution, e.g. 8 MP or more, ideally 12 MP or more. The image may be captured in color, grayscale, black and white, or with any other known optical effect. The term "image" as referred to herein is meant to encompass any type of data corresponding to the output of the camera, including raw data, processed data, etc.

In one general embodiment, a method includes receiving an image; determining a color depth of the received image, the color depth corresponding to at least one of grayscale, bi-tonal and color: reducing color depth of the received image to generate a bi-tonal representation of the image in response to determining the color depth of the received image is not bi-tonal; identifying a set of one or more graphical line candidates in either the bi-tonal image or the bi-tonal representation, the graphical line candidates including one or more of true graphical lines and false positives; discriminating any of the true graphical lines from any of the false positives: removing the true graphical lines from the bi-tonal image or the bi-tonal representation without removing the false positives to generate a component map comprising connected components and excluding graphical lines: and identifying one or more of the connected components in the component map.

In another general embodiment, a system includes a processor and logic in and/or executable by the processor to: receive an image; determine a color depth of the received image, the color depth corresponding to at least one of grayscale, bi-tonal and color; reduce color depth of the received image to generate a bi-tonal representation of the image in response to determining the color depth of the received image is not bi-tonal; identify a set of one or more graphical line candidates in the bi-tonal representation, the graphical line candidates including one or more of true graphical lines and false positives; discriminate any of the true graphical lines from any of the false positives; remove the true graphical lines from the bi-tonal representation without removing the false positives to generate a component map comprising connected components and excluding graphical lines; and identify one or more of the connected components in the component map.

In yet another general embodiment, a computer program product includes: a computer readable storage medium having program code embodied therewith, the program code readable/executable by a processor to: receive an image; determine a color depth of the received image, the color depth corresponding to at least one of grayscale, bi-tonal and color; reduce color depth of the received image to generate a bi-tonal representation of the image in response to determining the color depth of the received image is not bi-tonal; identify a set of one or more graphical line candidates in the bi-tonal representation, the graphical line candidates including one or more of true graphical lines and false positives; discriminate any of the true graphical lines from any of the false positives; remove the true graphical lines from the bi-tonal representation without removing the false positives to generate a component map comprising connected components and excluding graphical lines; and identify one or more of the connected components in the component map.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic." "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, processor, or device.

A computer readable signal medium may include a propagated data signal with computer readable program code embodied therein, for example, in baseband, as part of a carrier wave, an electrical connection having one or more wires, an optical fiber, etc. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
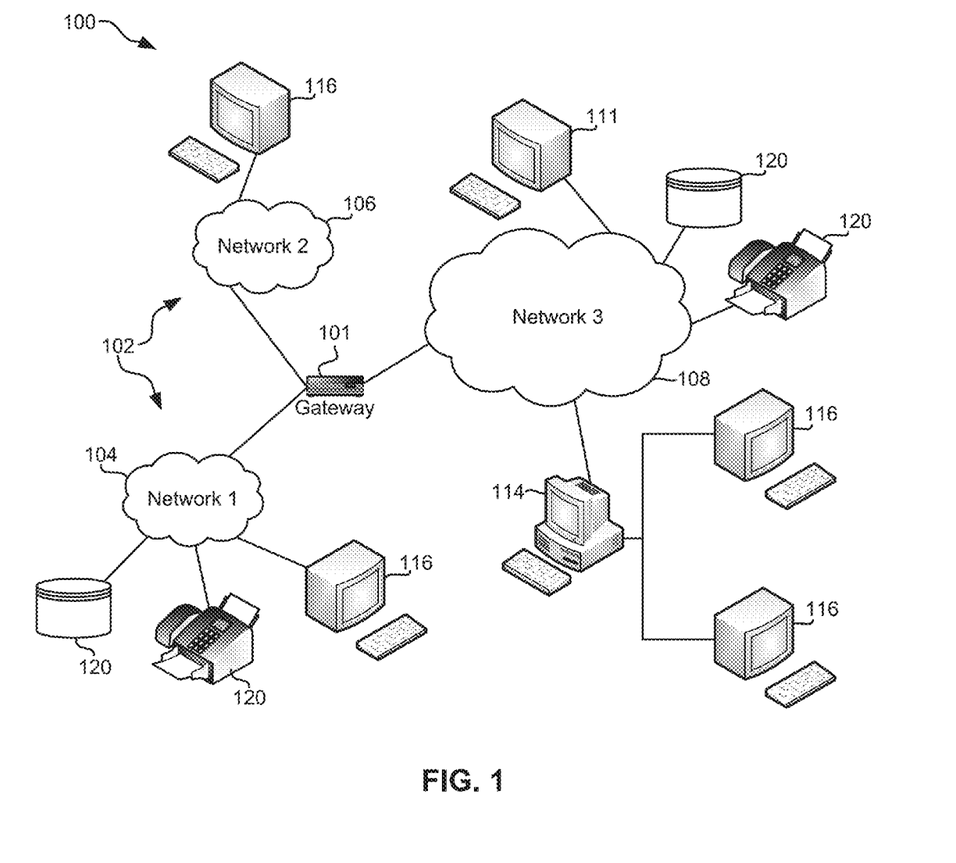
FIG. 1 illustrates a network architecture, in accordance with one embodiment.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
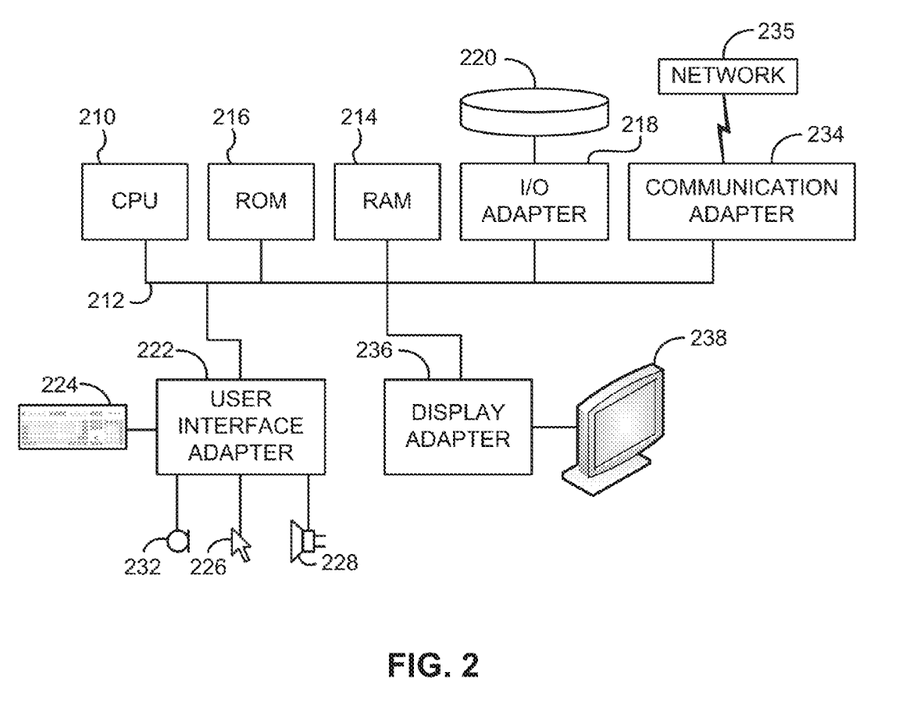
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

An application may be installed on the mobile device, e.g., stored in a nonvolatile memory of the device. In one approach, the application includes instructions to perform processing of an image on the mobile device. In another approach, the application includes instructions to send the image to a remote server such as a network server. In yet another approach, the application may include instructions to decide whether to perform some or all processing on the mobile device and/or send the image to the remote site.

In various embodiments, the presently disclosed methods, systems and/or computer program products may optionally utilize and/or include any of the image and/or video capture and processing functionalities disclosed in related U.S. patent application Ser. No. 13/740,123, filed Jan. 11, 2013, U.S. patent application Ser. No. 13/948,046, filed Jul. 22, 2013; U.S. patent application Ser. No. 13/802,226, filed Mar. 13, 2013; U.S. patent application Ser. No. 14/209,825, Filed Mar. 13, 2014, U.S. patent application Ser. No. 14/268,876, filed May 2, 2014 and/or U.S. Provisional Patent Application No. 61/819,463, filed May 3, 2013. Each of the foregoing patent applications are incorporated by reference for purposes of enabling the respective functionality disclosed therein.

For example, in several illustrative embodiments it may be advantageous to classify a document from which textual information is to be obtained, to perform data extraction on a document, to validate a document or information extracted from a document, to subject image data to additional processing (e.g. to improve image quality) before during or after the capture operation, etc. as would be understood by one having ordinary skill in the art upon reading the present descriptions.

Digital images suitable for processing according to the presently disclosed algorithms may be subjected to any image processing operations disclosed in the aforementioned patent application, such as page detection, rectangularization, detection of uneven illumination, illumination normalization, resolution estimation, blur detection, classification, data extraction, document validation, etc.

In more approaches, the presently disclosed methods, systems, and/or computer program products may be utilized with, implemented in, and/or include one or more user interfaces configured to facilitate performing any functionality disclosed herein and/or in the aforementioned related patent application, such as an image processing mobile application, a case management application, a classification application, and/or a data extraction application, in multiple embodiments.

In still more approaches, the presently disclosed systems, methods and/or computer program products may be advantageously applied to one or more of the use methodologies and/or scenarios disclosed in the aforementioned related patent application, among others that would be appreciated by one having ordinary skill in the art upon reading these descriptions.

It will further be appreciated that embodiments presented herein may be provided in the form of a service deployed on behalf of a customer to offer service on demand.

The presently disclosed inventive concepts concern detection, and identification of various types of markings from image data. The markings primarily considered herein are textual markings, such as machine-printed characters (i.e. typed font), hand-printed characters (i.e. non-machine printed characters)

Most notably, the present techniques provide the capability to identify regions of an image that depict machine and/or hand-printed characters, and further to distinguish among hand-printed characters that are likely to correspond to a signature versus hand-printed characters relatively unlikely to correspond to a signature (e.g. numerical characters, characters written in "print" as opposed to "cursive" writing style, etc. as would be understood by one having ordinary skill in the art upon reading the present descriptions.

As discussed further below, these techniques may implement a number of techniques such as neural networks, connected component analysis, computer vision, digital image capture, digital image quality analysis, image quality improvement, etc.; fundamental operational principles of which are not pertinent to the present descriptions and which are well known in the art. For purposes of this discussion, it is sufficient to comprehend that the present techniques may employ one or more of the aforementioned general mathematical approaches in the specific manner described herein to achieve unique and nonobvious results via application thereof.

In one approach, an exemplary technique falling generally within the scope of the present disclosures includes receiving an image: determining a color depth of the received image selected from at least grayscale, bi-tonal and color; reducing color depth of the received image to bi-tonal in response to determining the color depth of the received image is not bi-tonal; identifying one or more graphical line candidates in the bi-tonal image, the graphical line candidates including one or more of true graphical lines and false positives: discriminating true graphical lines from false positives; removing the true graphical lines from the bi-tonal image without removing the false positives to generate a component map; identifying one or more connected components in the component map using a connected components analysis; and labeling each connected component in the component map as either a hand-printed character, a machine-printed character, or an unknown character type based on the connected components analysis.

In more embodiments, the technique above may additionally and/or alternatively include one or more of: determining a connectedness of each connected component identified in the character map; determining whether each connected component corresponds to a handwritten character, a hand printed character, a signature, and a machine-printed character based on the connectedness thereof; and labeling each connected component as one of a handwritten character, a hand printed character, a signature, a machine printed character, and an unknown component.

In still more embodiments, exemplary techniques include determining whether each connected component corresponds to a handwritten character, a hand printed character, a signature, and a machine-printed character. Preferably, this determination is at least partially based on using neural network analysis, and the network is trained to distinguish among the aforementioned classes based on training sets comprising each respective class of component. Similarly, in various embodiments the determination may utilize one or more of the neural network, a support vector machine techniques, and maximum entropy discrimination techniques.

In even more approaches, the presently disclosed techniques may include displaying an indicator of each connected component, preferably in the form of a bounding box. Moreover, the indicator preferably identifies the connected component and whether the connected component corresponds to a handwritten character, a hand printed character, a signature, or a machine-printed character, in some embodiments.

The presently disclosed techniques may additionally and/or alternatively include performing a neighbor analysis to determine whether a label of one or more adjacent components is identical to a label of the connected component. Subsequently, the technique includes either confirming the connected component label in response to determining the label of one or more adjacent components is identical to the label of the connected component; or refuting the connected component label in response to determining the label of one or more adjacent components is different than the label of the connected component. This type of neighbor analysis can help avoid false positive identification of hand-printed components as machine-printed (e.g. due to unusual accuracy and precision of the hand-printed character corresponding to a similar character in a machine-printed font) and vise-versa (e.g. as may occur for fonts intended to simulate cursive handwriting, such as Lucida Handwriting).

Similarly, in cases where a false-positive is identified (due to mismatch between the component label and neighboring component labels), the method may include modifying the connected component label to match at least one of the adjacent components in response to refuting the connected component label.

The aforementioned principles will now be demonstrated with reference to FIGS. 3A-3E, below.

Figure 3A:
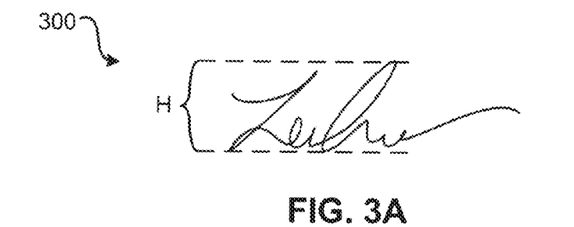
FIGS. 3A-3E depicts several exemplary signatures, and the "connectedness" of component(s) forming each exemplary signature, according to various embodiments.
Figure 3B:
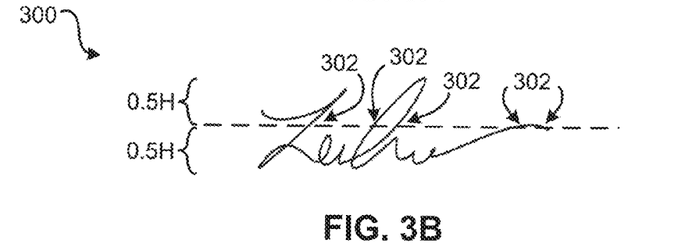
Figure 3C:
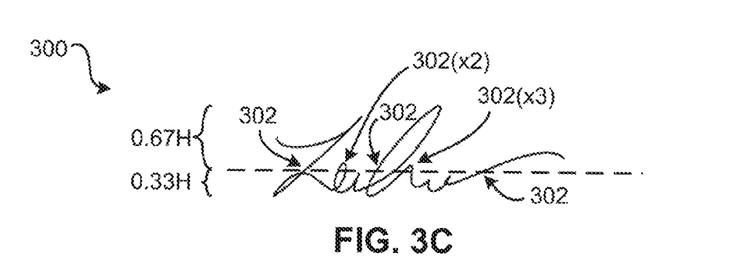
Figure 3D:
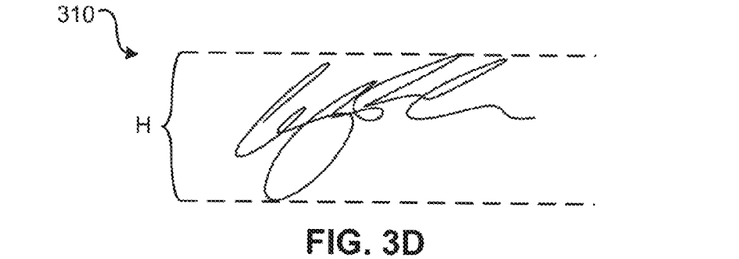
Figure 3E:
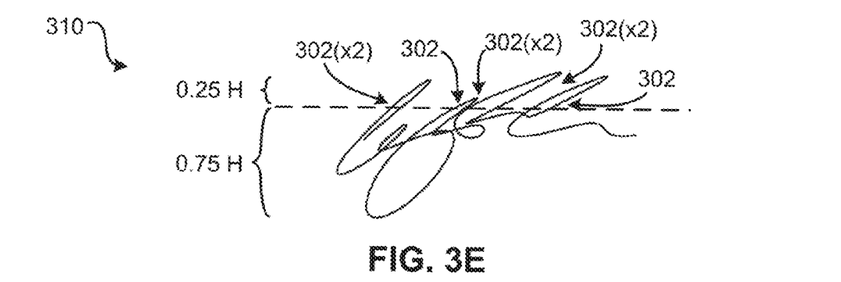

FIGS. 3A and 3D, below, depict two unique signatures 300, 310, respectively. The signatures 300 and 310 were each produced by hand and, are each characterized by a maximum vertical stroke height H. FIGS. 3B-3C and 3E depict various embodiments of a connectedness analysis according to different suitable height thresholds, in some approaches.

More specifically, and with reference to FIGS. 3A-3E, two exemplary signatures 300/310 written by hand are shown according to several embodiments. The signatures 300/310 are characterized by a vertical component and a horizontal component, and the vertical component has a maximum length of H measuring a linear vertical distance between an uppermost and a lowermost portion of the signature 300/310. As described above, and within the scope of the present descriptions, characters may be analyzed to determine a "connectedness" thereof in the course of identifying and/or disambiguating handwritten signatures from other hand printed characters and/or machine-printed characters, in various embodiments.

In a preferred approach, the connectedness of a given component or marking may be defined according to a number of transitions across a threshold position (represented by the horizontal, intersecting dashed line in FIGS. 3B, 3C and 3E) within the area depicting the signature 300, 310. In the context of FIG. 3B, the threshold position is approximately a vertical midpoint along the length of the vertical component having maximum length H, dividing the image vertically in half, each half having a vertical component of length 0.5H. Of course, in other embodiments, such as shown in FIG. 3C, the threshold position may be placed elsewhere. For example, in one approach the threshold position may be located approximately along a lowermost vertical third of the marking/component height, such that the vertically separated portions of the signature 300 have length of approximately 0.33H and about 0.67H, respectively.

In even more approaches, such as shown in FIG. 3D, the threshold position may be located at an uppermost vertical quarter of the marking or component height, such that the vertically separated portions of the signature 310 have length of approximately 0.25H and about 0.75H, respectively.

Of course, in various approaches, the threshold position may be located elsewhere, and/or may define a threshold according to any orientation or configuration of the image. While preferably located approximately at a vertical midpoint, in various embodiments the threshold position may be located at any vertical or horizontal position, and may divide the corresponding portion of the image into any number of sections (although a bisection is the preferred technique).

Similarly, in some approaches an optimal location for the threshold position may vary according to a priori knowledge regarding any expected signature (e.g. if it is known that a signature is substantially confined to a particular vertical or horizontal region, the threshold may be defined to coincide with or avoid that region, as would be understood by one having ordinary skill in the art upon reading the present descriptions.

Regardless of where the threshold position is defined, the "connectedness" of a given marking, signature, component, etc. is defined according to a number of times the threshold position is traversed by a portion of the marking, signature, component, etc. In FIGS. 3A-3E, these traversals are indicated by arrows 302 (some of which correspond to multiple traversals, as indicated by the "x2" and/or "x3" indicators, e.g. in FIG. 3C).

For example, as shown in FIG. 3B, the signature 300 is characterized by a "connectedness" of five (5) because the signature 300 traverses the threshold position (0.5H) five times. Similarly, the connectedness of the signature shown in FIG. 3C is eight (8) because the signature 310 traverses the threshold position (0.33H) eight times.

In preferred embodiments, the connected component is determined to be a signature in response to determining the connected component is characterized by one or more of a connectedness of at least 5, a width no greater than about 70% of a maximum stroke height of the connected component, and a width of at least about 0.4 inches.

Figure 4:
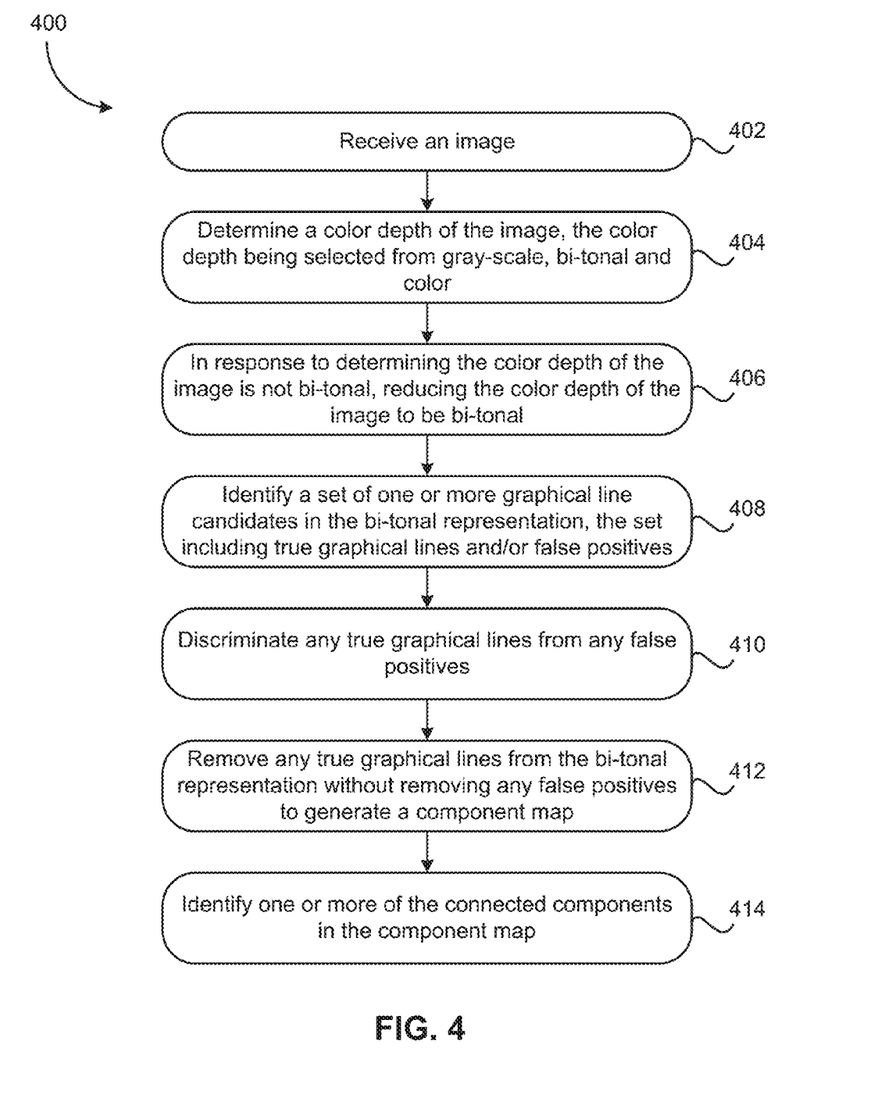
FIG. 4 is a flowchart of a method, according to one embodiment.

Accordingly, the present inventive techniques may be summarized in a process flow substantially as shown in method 400 of FIG. 4, according to one embodiment. The method 400 may be performed in any suitable environment, including those depicted in FIGS. 1-2 and utilizing input such as shown in FIGS. 3A-3E.

In operation 402, image data are received. The image data may be captured using any known device, technique, or combination thereof known to one having ordinary skill in the art and which would be appreciably advantageous to that skilled artisan upon reading these descriptions. Of course, image data may refer to data representing color, grayscale, bitonal, etc. images, may include a single frame of video data, a still image, a scanned image, etc. as would be understood by a person having ordinary skill in the art upon reading these prescriptions.

In operation 404, the received image data are analyzed to determine whether the image data are represented by binary (i.e. 1-bit) color depth information, i.e. whether the image is "bi-tonal." In some approaches, it is advantageous to work with image data including color information, while similarly a grayscale or bitonal color depth may be preferred in other approaches. For purposes of this description, bitonal image data will be offered for simplicity of description, but it should be appreciated that the instantly disclosed concepts may be equally applied to grayscale and/or color information in any manner that a skilled artisan would appreciate having awareness of this disclosure.

If it is determined in operation 404 that the image data are not bi-tonal, then in operation 406 the image data are rendered bi-tonal using any suitable technique. Preferably, the rendering comprises a color depth reduction.

The bi-tonal image is then subjected to a graphical line removal process to eliminate artificial connections between characters, i.e. connections arising from any source other than the shape of the character per se. Preferably, the graphical line removal process removes all substantially vertical and horizontal lines from the image data, e.g. removes any lines that would form the border of a field, box, signature line, header, section break, table, graph, spreadsheet, etc. as would be understood by skilled artisans reading the instant disclosure.

To this effect, in operation 408, the method 400 includes identifying a set of graphical line candidates which may include one or more of true graphical lines and false positives.

"Graphical Lines" and "graphical line candidates" as described herein are defined by a consecutive run of pixels in a particular orientation (horizontal or vertical) greater than a minimum consecutive pixel threshold, which may be defined absolutely (i.e. a particular number of pixels) or relatively (e.g. a number of pixels corresponding to at least a minimum portion of a total length of the image along a coincident dimension, e.g. at least 33%, 50%, or 75% a width (for horizontal graphical lines) or height (for vertical graphical lines) of the overall component, signature, marking, document, etc. in various embodiments.

Similarly, "true graphical lines" are to be distinguished from false positives (e.g. "blocks" or parts of a photograph, logo, etc.), and can be identified using one or more filters according to distinguishing characteristics of the "other" features, e.g. a line has a maximum (threshold) thickness in a direction substantially perpendicular to the orientation along which the line lies, which distinguishes from blocks, polygons, photographs, spirals, symbols, and similar features having a somewhat or at least partially globular (rather than linear) structure. The filtering is preferably based on one or more distinguishing characteristics such as feature length, feature thickness, feature pixel density, and feature size.

In one embodiment, the maximum thickness is a value corresponding to less than about 0.1 inches, and preferably the maximum thickness is a value corresponding to less than about 0.08 inches. The value may correspond to these distances either absolutely or relatively, i.e. the thickness of a particular graphical line candidate may be evaluated based on an absolute thickness of the line as appearing in the image (without respect to image resolution), or may be evaluated based on a relative number of pixels determined to correspond to the maximum thickness measured in inches for a particular image resolution.

While in various embodiments the maximum thickness may be a value different than the exemplary ranges set forth above, the inventors have determined that a maximum thickness value corresponding to 0.08 inches is particularly advantageous in the context of typical documents depicting signatures and graphical lines, e.g. financial documents such as a check, a loan or credit application, insurance form, etc.; legal documents such as a contract, release or authorization form, etc.; medical documents such as a chart, prescription, etc. and other document types that typically depict graphical lines as defined herein.

For document types that do not conform to the general layout and content of the document types listed above, e.g. hypothetically credit cards, driver licenses and other forms of identification, etc., it may be preferable to use a different maximum thickness value (which may be determined experimentally based on characteristics of several exemplary documents of that type, e.g. using machine learning techniques generally known in the art).

In various embodiments, the method 400 accordingly includes operation 410, in which true graphical lines are discriminated from any false positives that might have been included in the set of graphical line candidates.

Once identified, method 400 may invoke operation 412 in which the true graphical lines are removed from the bi-tonal representation or image. The resulting image/representation is a "component map" comprising a plurality of connected components corresponding to machine printed characters, hand printed characters, signatures and/or false positives but excluding any true graphical lines therefrom.

In preferred approaches, graphical line removal includes eliminating any lines fitting the above definition, but also includes reconstructing any estimated characters for which portions thereof were removed in the process of removing the graphical lines. For example, if a lowercase letter "y" were depicted in a field of a form (the field bounded with a black box), then the lower portion of the "y" letter would be separated from the upper portion in the course of graphical line removal (assuming the "y" was vertically straddling the lower boundary of the black bounding box). The preferred embodiment of this disclosed inventive approach is to reconstruct the removed portion of the "y" to recreate the connection between the upper and lower halves that straddled the removed lower boundary of the black bounding box.

Method 400 also includes identifying one or more of the connected components in the component map in operation 414. Preferably, operation 414 includes identifying at least those connected components which correspond to machine printed text, hand printed characters, and/or signatures.

In addition to the foregoing, and/or as an alternative embodiment, method 400 may optionally include any one or more of the following features and/or operations.

In one approach, the identifying performed in operation 414 may include determining a connectedness of the one or more connected components in the component map; determining whether each of the one or more connected components corresponds to a particular class of components based on the connectedness thereof. The class of components to which each of the one or more connected components corresponds is selected from unknown, handwritten characters, signature, and machine-printed characters. The result determined from operation 414 may be utilized to appropriately label each of the one or more connected components based on the particular class of components to which the connected component corresponds.

In various approaches, the result of the method 400 may be one or more of output (e.g. to a processor and/or memory of a computer or mobile device) and displayed (e.g. via a display of the computer or mobile device). The result includes an indicator associated with each connected component. Each indicator identifies one or more of the connected component (e.g. character identity, component location, etc.) and the particular class to which the connected component corresponds. Preferably the indicator is one or more of the label identifying the particular class to which the connected component corresponds, and a bounding box surrounding the connected component.

The outputting may include associating each indicator as metadata with one or more of the bi-tonal image, the bi-tonal representation, and the received image. In such embodiments, it is useful for the metadata identify at least a position of the connected component and the particular class to which the connected component corresponds. Preferably, the position of the connected component identifies each pixel of the image forming the connected component, e.g. according to a coordinate system.

Determining the connectedness of the one or more connected components may include determining, for each of the one or more connected components, a number of connected component transitions across a vertical threshold position. In various approaches, the vertical threshold position at approximately a midpoint of a maximum vertical stroke height of each of the one or more connected components prior to determining the connectedness of the connected component: at approximately two thirds of a maximum vertical stroke height of each of the one or more connected components prior to determining the connectedness of the connected component; at approximately three quarters of a maximum vertical stroke height of each of the one or more connected components prior to determining the connectedness of the connected component, etc. as would be understood by a person having ordinary skill in the art upon reading the present descriptions.

Preferably, the particular class to which the connected component corresponds is determined to be a signature in response to determining one or more of the following conditions are satisfied: the number of connected component transitions is at least 5, the connected component is characterized by a maximum stroke height less than about 70% of a width of the connected component, and the connected component is characterized by a width of at least 0.4 inches.

In more embodiments, the method may also include a neighbor analysis to determine whether the particular class to which one or more adjacent components is identical to the particular class to which the connected component corresponds. Based on the determination, the method may include either confirming or refuting the particular class to which the connected component corresponds.

In one embodiment, and in response to determining, e.g., the adjacent component has a different class than the connected component, and accordingly refuting the connected component label, it may be advantageous to modify the particular class to which the connected component corresponds to match the particular class to which one or more of the adjacent connected components correspond, or to modify the particular class to which the adjacent component corresponds, respectively. In this manner it is advantageously possible to normalize the component classifications based on classification of neighboring components, increasing the overall accuracy of the identification based on the assumption that adjacent components are statistically much more likely to belong to the same class than different classes. Put another way, it is more likely that adjacent components to a signature component are also signature components as opposed to machine printed or hand printed characters.

Determining whether each connected component corresponds to a particular class of connected components preferably leverages techniques such as support vector analysis, maximum entropy discrimination analysis, and neural network analysis.

Of course, as would be understood by those having ordinary skill in the art upon reading the present descriptions, the inventive concepts disclosed herein may be employed to any suitable scenario, implementation, application, etc. that involves the use of optical input as a source of textual information. While several exemplary scenarios have been set forth above to illustrate the concepts and features of the inventive subject matter disclosed herein, those having ordinary skill in the art will appreciate that these concepts are equally applicable to any number of similar scenarios, implementations, practical applications, etc.

While the present descriptions have been made with primary reference to methods, one having ordinary skill in the art will appreciate that the inventive concepts described herein may be equally implemented in or as a system and/or computer program product.

For example, a system within the scope of the present descriptions may include a processor and logic in and/or executable by the processor to cause the processor to perform steps of a method as described herein.

Similarly, a computer program product within the scope of the present descriptions may a computer readable storage medium having program code embodied therewith, the program code readable/executable by a processor to cause the processor to perform steps of a method as described herein.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A method, comprising:
   receiving an image;
   determining a color depth of the received image, the color depth corresponding to at least one of grayscale, bi-tonal and color;

reducing color depth of the received image to generate a bi-tonal representation of the image in response to determining the color depth of the received image is not bi-tonal;

identifying a set of one or more graphical line candidates in either the bi-tonal image or the bi-tonal representation, the graphical line candidates including one or more of true graphical lines and false positives;

discriminating any of the true graphical lines from any of the false positives;

removing the true graphical lines from the bi-tonal image or the bi-tonal representation without removing the false positives to generate a component map comprising connected components and excluding graphical lines;

identifying one or more of the connected components in the component map; and one or more of:
outputting an indicator of each of the connected components, each indicator identifying one or more of the connected component and a particular class to which the connected component corresponds; and
displaying the indicator of each of the connected components; and
wherein the indicator comprises one or more of a label identifying the particular class to which the connected component corresponds, and a bounding box surrounding the connected component.

2. The method as recited in claim 1, the identifying further comprising:
determining a connectedness of the one or more connected components in the component map;
determining whether each of the one or more connected components corresponds to a particular class of components based on the connectedness thereof, wherein the class of components to which each of the one or more connected components corresponds is selected from unknown, handwritten characters, signature, and machine-printed characters; and
labeling each of the one or more connected components based on the particular class of components to which the connected component corresponds.

3. The method as recited in claim 2, wherein determining the connectedness of the one or more connected components comprises determining, for each of the one or more connected components, a number of connected component transitions across a vertical threshold position.

4. A method, comprising:
receiving an image;
determining a color depth of the received image, the color depth corresponding to at least one of grayscale, bi-tonal and color;
reducing color depth of the received image to generate a bi-tonal representation of the image in response to determining the color depth of the received image is not bi-tonal;
identifying a set of one or more graphical line candidates in either the bi-tonal image or the bi-tonal representation, the graphical line candidates including one or more of true graphical lines and false positives;
discriminating any of the true graphical lines from any of the false positives;
removing the true graphical lines from the bi-tonal image or the bi-tonal representation without removing the false positives to generate a component map comprising connected components and excluding graphical lines;
identifying one or more of the connected components in the component map, the identifying further comprising:
determining a connectedness of the one or more connected components in the component map, wherein determining the connectedness of the one or more connected components comprises determining, for each of the one or more connected components, a number of connected component transitions across a vertical threshold position;
determining whether each of the one or more connected components corresponds to a particular class of components based on the connectedness thereof, wherein the class of components to which each of the one or more connected components corresponds is selected from unknown, handwritten characters, signature, and machine-printed characters, wherein the particular class to which the connected component corresponds is determined to be a signature in response to determining the number of connected component transitions is at least 5; and
labeling each of the one or more connected components based on the particular class of components to which the connected component corresponds.

5. The method as recited in claim 4, wherein the particular class to which the connected component corresponds is determined to be a signature further in response to determining the connected component is characterized by a maximum stroke height less than about 70% of a width of the connected component.

6. The method as recited in claim 4, wherein the particular class to which the connected component corresponds is determined to be a signature further in response to determining the connected component is characterized by a width of at least 0.4 inches.

7. The method as recited in claim 3, further comprising defining the vertical threshold position at approximately a midpoint of a maximum vertical stroke height of each of the one or more connected components prior to determining the connectedness of the connected component.

8. The method as recited in claim 3, further comprising defining the vertical threshold position at approximately two thirds of a maximum vertical stroke height of each of the one or more connected components prior to determining the connectedness of the connected component.

9. The method as recited in claim 3, further comprising defining the vertical threshold position at approximately three quarters of a maximum vertical stroke height of each of the one or more connected components prior to determining the connectedness of the connected component.

10. The method as recited in claim 2, further comprising one or more of outputting and displaying an indicator of each connected component, each indicator identifying one or more of the connected component and the particular class to which the connected component corresponds, and
wherein the indicator comprises one or more of the label identifying the particular class to which the connected component corresponds, and a bounding box surrounding the connected component.

11. The method as recited in claim 10, the outputting comprising associating each indicator as metadata with one or more of the bi-tonal image, the bi-tonal representation, and the received image, and
wherein the metadata identify at least a position of the connected component and the particular class to which the connected component corresponds.

12. The method as recited in claim 11, wherein the position of the connected component identifies each pixel of the image forming the connected component.

13. The method as recited in claim 2, further comprising performing a neighbor analysis to determine whether the particular class to which one or more adjacent components is identical to the particular class to which the connected component corresponds; and either confirming the particular class to which the connected component corresponds in response to determining the particular class to which the one or more adjacent components corresponds is identical to the particular class to which the connected component corresponds; or refuting a label associated with the connected component and identifying the particular class to which the connected component corresponds in response to determining the particular class to which the connected component corresponds is different than the particular class to which the one or more adjacent components correspond.

14. The method as recited in claim 13, wherein the method comprises the refuting, and the neighbor analysis further comprising, in response to refuting the connected component label, modifying the particular class to which the connected component corresponds to match the particular class to which one or more of the adjacent connected components correspond.

15. The method as recited in claim 1, wherein determining whether each connected component corresponds to a particular class of connected components comprises one or more of support vector analysis, maximum entropy discrimination analysis, and neural network analysis.

16. The method as recited in claim 1, wherein the discriminating comprises filtering the image to remove one or more at least partially globular features from the set of graphical line candidates; and wherein the filtering is based on one or more of feature length, feature thickness, feature pixel density, and feature size.

17. The method as recited in claim 16, wherein the set of graphical line candidates are characterized by a thickness less than a threshold thickness, the thickness being measured in a direction substantially perpendicular to an orientation along which the true graphical line lies.

18. The method as recited in claim 17, wherein the threshold thickness corresponds to a value less than about 0.1 inches.

19. A computer program product comprising: a non-transitory computer readable storage medium having program code embodied therewith, the program code readable and/or executable by a processor to:

receive an image;

determine a color depth of the received image, the color depth corresponding to at least one of grayscale, bi-tonal and color;

reduce color depth of the received image to generate a bi-tonal representation of the image in response to determining the color depth of the received image is not bi-tonal;

identify a set of one or more graphical line candidates in the bi-tonal representation, the graphical line candidates including one or more of true graphical lines and false positives;

discriminate any of the true graphical lines from any of the false positives;

remove the true graphical lines from the bi-tonal representation without removing the false positives to generate a component map comprising connected components and excluding graphical lines;

identify one or more of the connected components in the component map, wherein identifying the one or more of the connected components in the component map comprises:

determining a connectedness of the one or more connected components in the component map;

determining whether each of the one or more connected components corresponds to a particular class of components based on the connectedness thereof, wherein the class of components to which each of the one or more connected components corresponds is selected from unknown, handwritten characters, signature, and machine-printed characters; and labeling each of the one or more connected components based on the particular class of components to which the connected component corresponds; and one or more of outputting and displaying an indicator of each connected component, each indicator identifying one or more of the connected component and the particular class to which the connected component corresponds; and wherein each indicator respectively comprises one or more of the label identifying the particular class to which the connected component corresponds, and a bounding box surrounding the connected component.

* * * * *